UNITED STATES PATENT OFFICE.

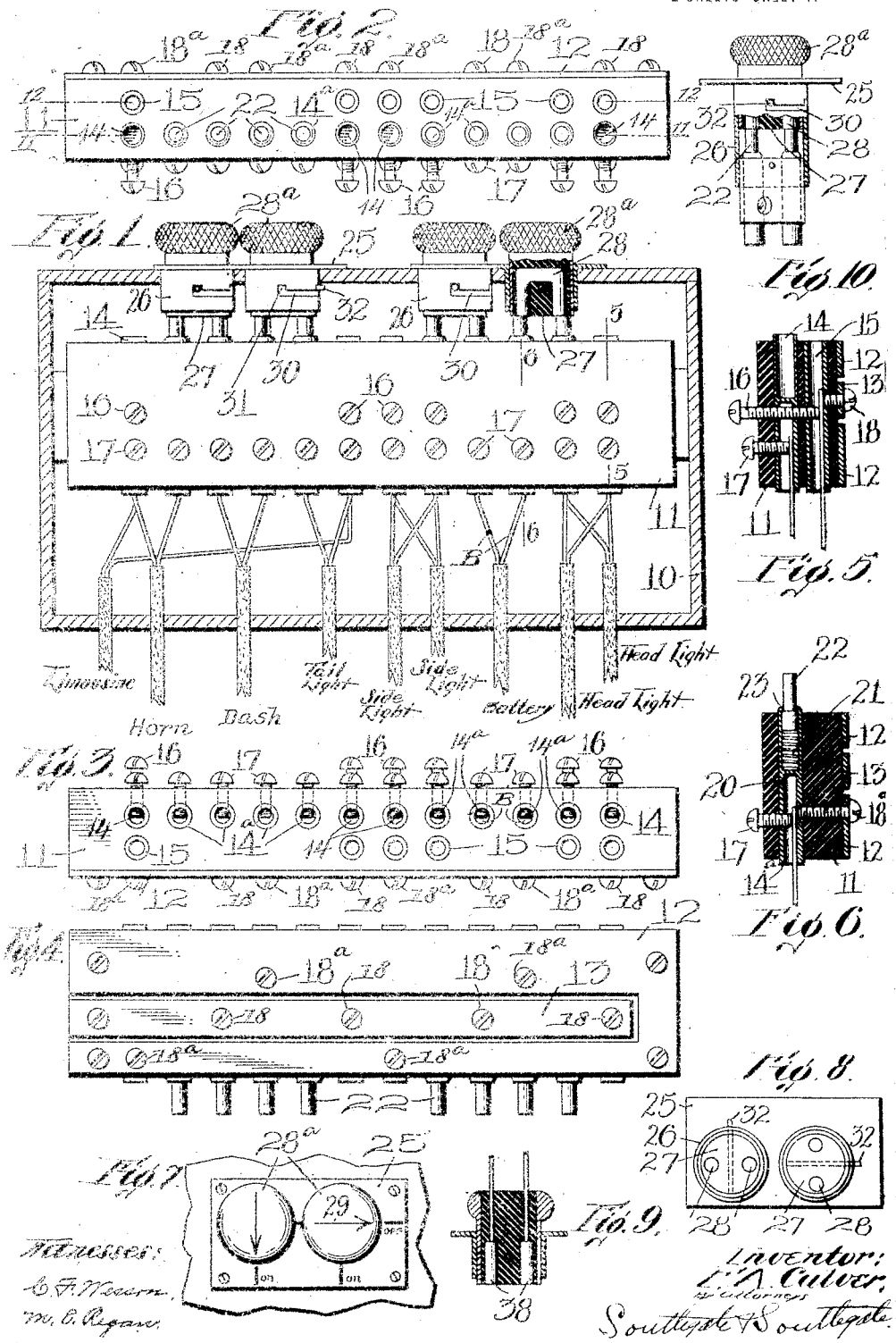

FRED A. CULVER, OF WORCESTER, MASSACHUSETTS.

JUNCTION-BOX AND SWITCH.

1,165,572.  Specification of Letters Patent.  Patented Dec. 28, 1915.

Application filed January 16, 1912. Serial No. 671,441.

*To all whom it may concern:*

Be it known that I, FRED A. CULVER, a citizen of the United States, residing at Worcester, in the county of Worcester and State of Massachusetts, have invented a new and useful Junction-Box and Switch, of which the following is a specification.

This invention relates to a junction box or other connector for general electrical purposes, but is particularly adapted for junction boxes for use on automobiles and in similar places where a battery or other source of power is designed to operate a number of different lights and other electrical devices all or a portion of which may be on at the same time.

The principal objects of the invention are to provide a simple and inexpensive construction of junction box for this purpose in particular and other electrical purposes in general which will present a neat and attractive appearance and take up very little room and will permit the location of any desired number of switches in proximity to each other and by which they can be so arranged that all the connections can be made at substantially a single point.

The invention also involves an improved switch arrangement whereby in order to turn the switches it will be necessary for the operator to press the switch turning device out of its locked position against spring pressure and then turn it so that it can be automatically sprung into locked position, no matter whether it is being turned on or off.

Further objects and advantages of the invention will appear hereinafter.

Reference is to be had to the accompanying drawings in which—

Figure 11:
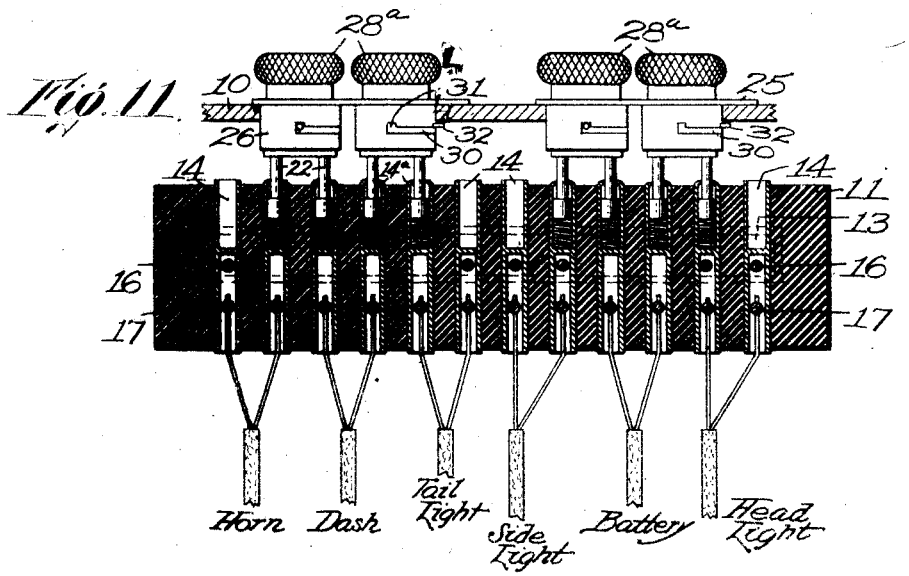
Figure 12:
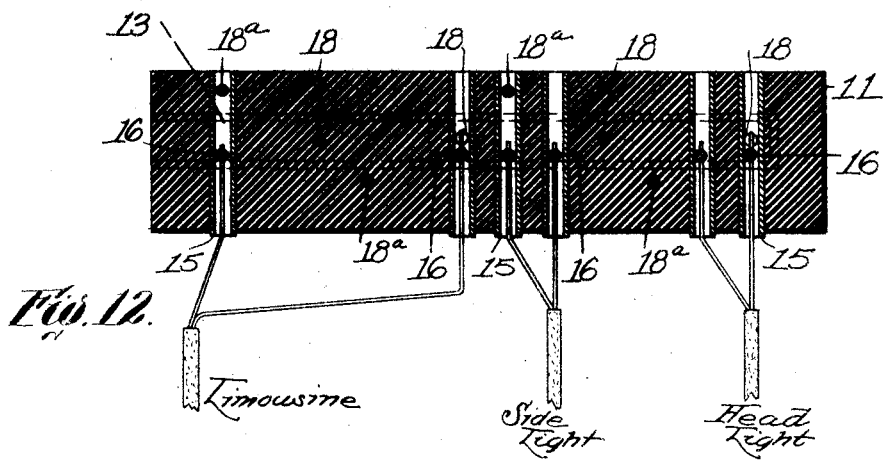

Figure 1 is a front elevation of a junction box constructed in accordance with this invention, parts being shown in section. Fig. 2 is a plan of the insulating plate of the junction box with the switches and box proper removed. Fig. 3 is a bottom plan view of a similar nature. Fig. 4 is a rear elevation. Fig. 5 is a sectional view on the line 5—5 of Fig. 1. Fig. 6 is a sectional view on the line 6—6 of Fig. 1. Fig. 7 is a plan of a pair of switch knobs; Fig. 8 is a bottom plan of a pair of switch knobs removed from the rest of the apparatus. Fig. 9 is a central sectional view of the switch in modified form, Fig. 10 is an elevation of another form, Fig. 11 is a sectional view on the line 11—11 of Fig. 2; and Fig. 12 is a sectional view on the line 12—12 of Fig. 2.

As has been stated, the invention is capable of general use. A special form is illustrated herein particularly adapted for use on automobiles and designed specially to be applied to the dash thereof. This form is shown as comprising a casing or box 10 adapted to be placed on the dash and having therein an insulating plate 11 formed of vulcanized fiber or other insulating material. This plate is provided with two bus bars 12 and 13 on one face thereof. These bus bars ordinarily are on the back face. Extending into, and preferably through the plate, are a plurality of tubular conductors 14 or 14$^a$ preferably formed of brass or similar conducting material. These are arranged in a plane parallel with the plane of the bus bars and extend from the top to the bottom of the insulating plate. The bottoms of these tubes are open to receive the various contacting terminals from the several electrical devices which are to be connected. Located parallel with these conductors, and between them and the bus bars, are another series of conductors 15 of somewhat similar form, open at the bottom for the same purpose. Each of the conductors 15 is adjacent and parallel to one of the conductors 14 or 14$^a$ but there are not so many of them, preferably. In each case where a pair of conductors are located a binding screw 16 is inserted from the front of the plate 11 through the front conductor 14 and into the interior of the rear conductor 15 to permit binding the terminal of a conductor as shown in Fig. 5. The conductors 14 are provided with shorter binding screws 17 for the latter purpose. It is to be observed that the screws 16 connect the two conductors 14 and 15. On the rear the bus bars are connected to the desired conductors 15 by binding screws 18 and 18$^a$. All these screws that connect with the bus bar 12 are designated 18$^a$ and those that connect with the bus bar 13 are called 18, no matter what their length.

As so far described the conductors 14 and 14$^a$ are all alike but from reference to Figs. 5 and 6 it will be seen that there are two kinds of them. The one 14 shown in Fig. 5 is open at its upper end, this end serving no purpose and it is not necessary to have it extend beyond the screw 16 upwardly. These tubes 14 serve merely as conductors and for receiving and holding the terminals from the lights, horn, battery, etc. But the tubular conductors 14ᵃ shown in Fig. 6 are each provided with a transverse partition 20 on which is a spring 21 for pressing upwardly a plunger 22. In this case the end of the tube is drawn in at 23 to limit the upward motion of the plunger. These plungers 22 are arranged in pairs, those of each pair being designed to be connected for the purpose of operatively connecting some one of the electrical devices with the battery or other source of power.

The box 10 is provided with a plurality of top plates 25 each one having a casing 26 extending downwardly therefrom, this casing being preferably of cylindrical form. In each casing is located a slidable and oscillatable cylindrical insulating block 27 having a conductor 28 shown as of U-shape. To each block is fixed a knob 28ᵃ on the end having an arrow 29 thereon and the plate 25 is provided with signs or words to indicate where the arrow is to point when the connection is on or off. By turning the knob it is obvious that the conductor 28 can be brought into position to connect or disconnect the two plungers.

The casing 26 is provided with a circumferential slot 30 having extensions 31 at each end at right angles to it and the block is provided with a pin 32 adapted to be guided in said slot. When the pin comes opposite one of the extensions the springs on the plungers force the block up, and cause the pin to be locked in the extension so that it is impossible to change the connection without pressing on the knob. In other words, the change in connection is made by pressing down on the knob and turning it as far as it will go and then allowing it to lock itself.

It is to be observed that the two battery terminals B are connected with two of the tubes 14ᵃ which extend through the plate 11. Both of these tubes 14ᵃ have plungers 22, one adapted to contact with one conductor 28 and the other with another. One of these tubes is connected by a screw 18 with the bus bar 13 and the other by a screw 18ᵃ with the bus bar 12 as indicated in Figs. 4 and 11. Therefore, it will be seen that these two bus bars constitute the two poles of the battery. One pair of head light terminals are connected with two tubes 15, one of which is connected by a screw 16 with a tube 14 and the other with a tube 14ᵃ. The other pair of head light terminals is connected respectively with these two tubes 14 and 14ᵃ. This particular tube 15 which is connected with a tube 14 is also connected with the bus bar 13 by one of the screws 18. This tube 14ᵃ is not connected with either bus bar but is provided with the plunger 22 which can be connected by the conductor 28 with the next plunger 22 which as stated is connected with the bus bar 12, so that the turning of that knob 28ᵃ, will connect and disconnect the head lights with the battery. The side lights are similarly connected, one pole being connected directly with the bus bar 12 and the other only with one of the plungers 22 connected with the second knob. The tail light is also directly connected at one side with the bus bar 13 by a screw 18 and at the other side with the plunger 22 under the third knob, while the horn is directly connected on one side with the bus bar 12 and on the other with one plunger 22 under the fourth knob. Each one of the other plungers 22 of these pairs is connected directly with the bus bar which is connected with the other pole of the head, side, tail light and horn respectively so that the turning of these four knobs will turn these several lights and horns on or off. On the other hand the limousine and the dash are shown as having their two terminals connected directly with the two bus bars 12 and 13, by two screws 18 and 18ᵃ and consequently they are always on, it being understood that a small switch is used on the dash or in any other convenient position for controlling these parts directly.

In the form shown in Fig. 9 the only modification consists in substituting for the U-shaped conductor 28 a pair of conductors 38 insulated from each other but extending through the knob and connected with each other outside as by a trouble lamp, or the like. In the form shown in Fig. 10 the casing 26 and its included parts is used for application to a plug of insulating material having two plungers 22 extending up from it. The manner of using the device is the same as in the other figures. It will be seen that this forms an extremely convenient arrangement for this particular purpose, as it provides for bringing all the connections to a single point and provides a very simple way of changing the terminals whenever desired.

It will be seen also that the way of turning the electrical devices on and off is extremely simple and one which is not likely to get out of order, as the contacting terminals rub against each other on every motion.

It will be seen further that the device while particularly adapted for application to the dash of an automobile, is also capable of general use either in the form shown or in any modification thereof coming within the skill of the skilled mechanic. Therefore I do not wish to be limited to all the details of construction shown and described herein or to the particular application referred to but What I do claim is:—

1. As an article of manufacture, a junction box comprising an insulating plate having bus bars on one side thereof and provided with conducting tubes in a plane parallel with the plane of the bus bars, a second set of tubes parallel with the first set, means supported by the plate for clamping a wire in each of the tubes, and means for connecting the second set of tubes with the bus bars.

2. As an article of manufacture, a junction box comprising an insulating plate having bus bars on one side thereof and provided with conducting tubes extending therethrough transversely but in a plane parallel with the plane of the bus bars, a second set of tubes parallel with the first set and each arranged adjacent to one of the first set and between the latter and the bus bars, means extending from one side of the plate through one tube of the first set into a tube of the second set for clamping a wire in said tube of the second set, means supported by the plate for clamping a wire in each of the tubes of the first set, and means for connecting the second set of tubes with the bus bars.

3. In a junction box the combination of an insulating plate, bus bars along one surface thereof, a set of conducting tubes passing into said plate, means for clamping wires in the end of each of said tubes, a second set of tubes each located between one of the first named tubes and the bus bars, means for clamping wires in the second set of tubes, and means for connecting each of the second tubes with one of the bus bars.

4. In a junction box, the combination of an insulating plate, bus bars on one surface of said plate, a set of conducting tubes in the plate, with their axes in a plane parallel with the plane of the bus bars, a second set of tubes parallel with the first set of tubes, each located between one of them and the bus bars, a set of screws extending into certain of the first set of tubes from the side of the plate opposite the bus bars for holding wires therein, a second set of screws extending through said tubes into the other set of tubes for holding the wires in them and connecting the two tubes together, and other screws on the opposite side of the plate for connecting certain of said tubes of the second series with the bus bars.

5. In a junction box, the combination of an insulating plate, bus bars along one surface thereof, a set of conducting tubes passing through said plate parallel with the plane of the bus bars, means for clamping wires in the end of each of said tubes, a second set of tubes each located between one of the first named tubes and the bus bars, means for clamping wires in the second set of tubes, means for connecting each of the second tubes with one of the bus bars, certain of said tubes of the first set being provided with a partition thereacross, a spring on the side of the partition opposite the binding screw, a plunger at the end of each spring, a casing located in position to span a pair of said plungers and having a conductor therein adapted to engage said plungers and bridge them, and means for moving said conductor.

6. In a junction box, the combination with an insulating plate having bus bars on one side, a series of binding screws along one edge for electrical terminals, a plurality of spring-pressed plungers along the front edge, means for connecting said plungers with said terminals, and a plurality of casings each covering a pair of said plungers and provided with a conductor for connecting the plungers which it covers, said conductor being rotatable on an axis between the plungers and parallel therewith, whereby it can be turned into and out of contact with the plungers.

In testimony whereof I have hereunto set my hand in the presence of two subscribing witnesses.

FRED A. CULVER.

Witnesses:
ALBERT E. FAY,
C. FORREST WESSON.